(12) United States Patent
Iyer et al.

(10) Patent No.: US 7,261,871 B2
(45) Date of Patent: Aug. 28, 2007

(54) FABRICATION OF CARBON NANOTUBE FILMS FROM ALKYNE-TRANSITION METAL COMPLEXES

(75) Inventors: Vivekanantan S. Iyer, Delft (NL); K. Peter C. Vollhardt, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 629 days.

(21) Appl. No.: 10/261,366

(22) Filed: Sep. 30, 2002

(65) Prior Publication Data
US 2003/0175199 A1 Sep. 18, 2003

Related U.S. Application Data

(60) Provisional application No. 60/325,988, filed on Sep. 28, 2001.

(51) Int. Cl.
*D01F 9/12* (2006.01)
*D01C 5/00* (2006.01)

(52) U.S. Cl. ............... 423/447.1; 423/447.2; 423/447.3; 977/742; 977/843

(58) Field of Classification Search ............ 423/447.1, 423/447.3; 977/742, 843
See application file for complete search history.

(56) References Cited

U.S. PATENT DOCUMENTS 5,695,734 A * 12/1997 Ikazaki et al. ............. 423/461
6,835,330 B2 * 12/2004 Nishino et al. ............ 252/503

OTHER PUBLICATIONS

Satishkumar, B. C. et al., 'Single-Walled Nanotubes by the Pyrolysis of Acetylene-Organometallic Mixtures' (Aug. 21, 1998), Elsevier, Chemical Physics Letters 293, pp. 47-52.*

* cited by examiner

*Primary Examiner*—Stuart L. Hendrickson
*Assistant Examiner*—Daniel C. McCracken
(74) *Attorney, Agent, or Firm*—R'Sue P. Caron; Lawrence Berkeley; National Laboratory

(57) ABSTRACT

A simple method for the production or synthesis of carbon nanotubes as free-standing films or nanotube mats by the thermal decomposition of transition metal complexed alkynes with aryl, alkyl, alkenyl, or alkynyl substituents. In particular, transition metal (e.g. Co, Ni, Fe, Mo) complexes of diarylacetylenes, e.g. diphenylacetylene, and solid mixtures of these complexes with suitable, additional carbon sources are heated in a vessel. More specifically, the heating of the transition metal complex is completed at a temperature between 400-800° C. and more particularly 550-700° C. for between 0.1 to 24 hours and more particularly 0.5-3 hours in a sealed vessel under a partial pressure of argon or helium.

18 Claims, 6 Drawing Sheets

FABRICATION OF CARBON NANOTUBE FILMS FROM ALKYNE-TRANSITION METAL COMPLEXES

RELATED APPLICATIONS

This application claims priority of Provisional Application Ser. No. 60/325,988 filed Sep. 28, 2001.

GOVERNMENT RIGHTS

The United States Government has rights in this invention pursuant to Contract No. DE-AC03-76SF00098 between the United States Department of Energy and the University of California.

BACKGROUND OF THE INVENTION

The present invention relates generally to methods for the production of carbon nanotubes, and more particularly to methods for the production of carbon nanotubes as free-standing films or nanotube mats by the thermal decomposition of transition metal complexes.

Carbon nanotubes, first reported by Iijima, have metallic electrical conductivity in the arm-chair configuration and are semi-conducting in a zig-zag structure. Because of the unique physical and chemical properties arising from their structure and size, they have potential applications in devices requiring efficient field emitters, high-strength fibers, strong radiation shields, energy absorbing materials, nano-scale catalytic beds, efficient gas storage, nano-circuits, nano-scale transistors, charge storage materials and white light sources. In addition, they also have potential applications as nano-sized, frictionless bearings, in the construction of nano-mechanical devices, electromechanical devices and opto-electronic devices. For most of these applications, it is desirable to synthesize nanotubes of high purity over a large area in film form. Control of diameter, morphology and lengths of the carbon nanotubes produced is also a useful requirement for practical applications of a particular process. In addition, simplicity and flexibility in the production and fabrication of carbon nanotubes will make a process commercially attractive.

Available carbon nanotube synthesis methods include arc discharge, laser ablation, and chemical vapor deposition (CVD) processes and variations of all these procedures. While the first two methods involve the breakage of graphite to carbon clusters and re-building of carbon nanostructures, the CVD process builds up the carbon nanotubes starting from smaller components. This difference directly relates to the efficiency of the processes with the CVD process being more efficient. Some of the reported CVD processes are economical, efficient and said to result in oriented films of nanotubes with the possibility of control of their diameter and lengths. The CVD and related processes involve the use of a metal catalyst (usually a transition metal) either pre-made on a support or made by in situ reduction of a suitable precursor and a carbon source in the form of a gas or vapor at high temperatures. Alternatively, a mixture of a carbon source (such as benzene, toluene or xylene) and a transition metal catalyst (such as ferrocene or nickelocene) as a metal source is pyrolyzed to produce nanotubes. These two general methods need high temperatures (typically >1000° C.) to produce the necessary catalytic particles.

Some of the drawbacks in the existing methods can be summarized as follows: 1. Lack of control/determination of metal (catalyst)/carbon (precursor) ratios in the starting materials and/or in the products. 2. Required fabrication of specialized apparatus. 3. Limited area coverage of nanotube mats. 4. Control of morphology of the produced nanotubes. 5. Lack of control in the yields of undesired side products, such as carbon onions and amorphous carbon. 6. High temperatures involved.

Accordingly it is desirable to provide an improved method of producing carbon nanotubes, particularly as free-standing films or nanotube mats. It is also desirable to provide a carbon nanotube fabrication method which reduces or eliminates the prior art process problems described above.

SUMMARY OF THE INVENTION

Accordingly it is an object of the invention to provide an improved method for fabricating carbon nanotubes.

Another object of the invention is to reduce the amorphous carbon content and carbon onions, and maximize the graphitized areas in the carbon nanotube product.

Yet another object of the invention is to produce transition metal particles for use in catalysis.

An additional object of the present invention is to simplify the production and fabrication of high quality nanotubes in the form of a film.

It is also an object of the present invention to provide a carbon nanotube fabrication method having a precise way to control metal/carbon ratios in the starting composition and the end products with the additional object of achieving the lowest possible metal/carbon ratios at the lowest possible temperatures.

The invention is a simple method for the production or synthesis of carbon nanotubes as free-standing films or nanotube mats by the thermal decomposition of transition metal complexed alkynes with aryl, alkyl, alkenyl, or alkynyl substituents, and solid mixtures of these complexes with suitable, additional carbon sources. One preferred embodiment is heating transition metal complexes of diarylacetylenes, e.g. diphenylacetylene, in a vessel. More specifically, the heating of the transition metal complex is completed at a temperature between 400-800° C. and more particularly 550-700° C. for between 0.1 to 24 hours and more particularly 0.5-3 hours in a sealed, vessel under a partial pressure of argon or helium. This heating results in the formation of carbon nanotubes, as free-standing films, in high yields. Removal of metal from these films, where necessary, is achieved by simply immersing the film in aqueous hydrochloric acid and the subsequent filtration of the dissolved metal.

DETAILED DESCRIPTION OF THE INVENTION

In accordance with the present invention, high quality, long carbon nanotubes, with narrow diameter distribution, can be prepared by heating transition metal complexed alkynes with aryl, alkyl, alkenyl, or alkynyl substituents in a sealed vessel. Preferably, before the heating, a weighed amount of the precursor complex is sealed in an atmosphere of an inert gas, preferably argon or helium, preferably at a pressure of about 20 mTorr, in a quartz vessel. The quartz vessel is then, preferably, maintained at a temperature of approximately 400-800° C. and more preferably at 550-700° C. for between 0.1 to 24 hours and more preferably 0.5-3 hours.

The invention utilizes alkynes having the general formula:

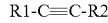

where each of R1, R2 is an aryl, alkyl, alkenyl, or alkynyl substituent. Illustrative compounds are: diphenylacetylene; 1-phenylpentyne; hexaethynylbenzene; and trans-4-phenyl-2-buten-1-yne.

The precursor materials are in the form of transition metal (including Co, Ni, Fe, Mo) complexes of alkynes (including diphenylacetylene and its derivatives). The complexes can be separately produced and isolated before use in the fabrication of the nanotubes, or they can be prepared in situ during the production of the nanotubes. Unlike other procedures known to date, since the elemental composition and precise structure of the starting complex is well established, the metal/carbon ratio of the precursor is predetermined accurately.

Figure 1:
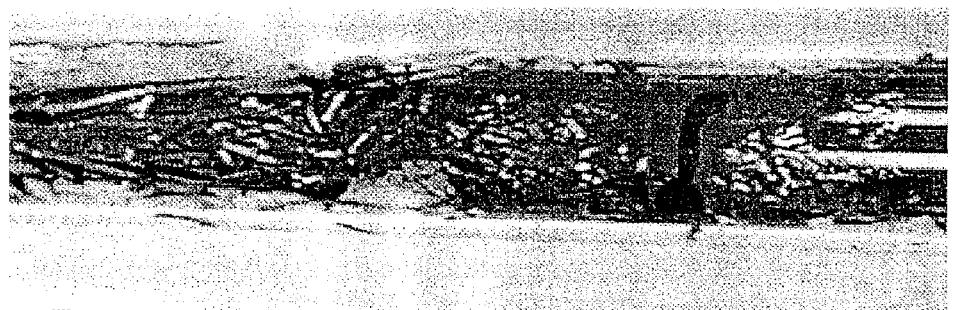
FIG. 1 is a photographic image of a film formed inside a quartz tube by the thermolysis of a carbon nanotube precursor according to the invention.

The nanotubes thus produced are in the form of free standing films (or nanomats) that can be simply lifted off from the inside of the vessel. Advantageously, coverage of areas more than 4 cm$^2$ can be achieved from about 30 mg of the starting complex. A film produced by this method is shown in FIG. 1.

In the production of the nanotubes from the metal complexed alkynes, most of the metal stays outside the nanotubes and is relatively easily washed away by acid. However, some of the metal, typically about 15%, is deposited inside the nanotubes in the form of crystalline metal nanoparticles. These metal nanoparticles may be used for catalysis applications. The metal nanoparticles may also be removed from the nanotubes by further acid treatment.

Conventional quantitative chemical analytical techniques as well as energy dispersion spectra in an electron microscope were used to analyze the products obtained, in order to determine the elemental compositions. Thus the elemental composition of the bulk product is also clearly ascertained.

Figure 2:
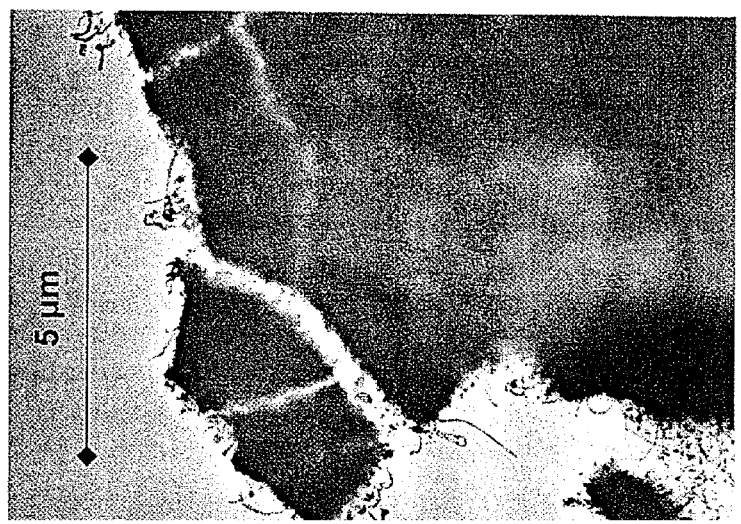
FIG. 2 is a low magnification, transmission electron micrograph of a film showing the abundance of nanotubes produced by the invention.
Figure 3:
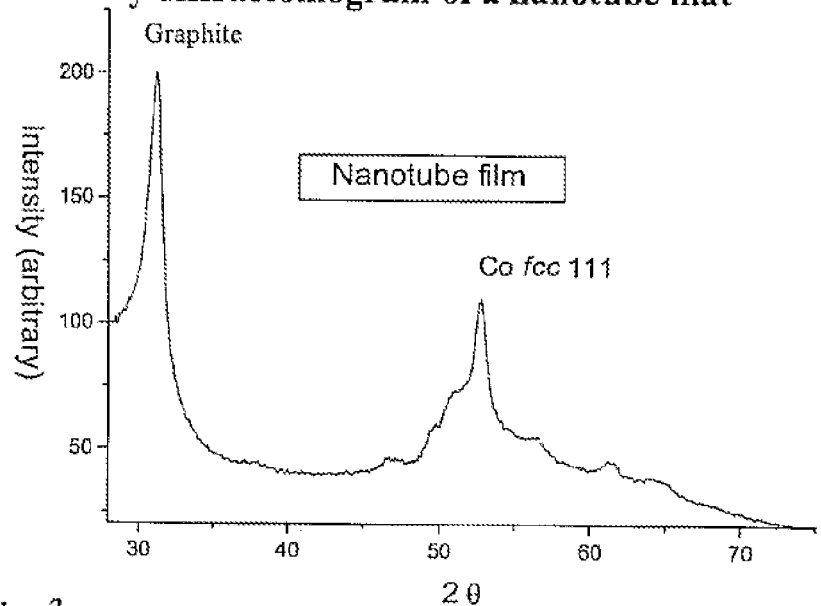
FIG. 3 is an X-ray diffraction pattern of a nanotube mat produced by the invention, showing the highly graphitized nature of the film and the crystalline nature of the metal (cobalt) present.
Figure 4:
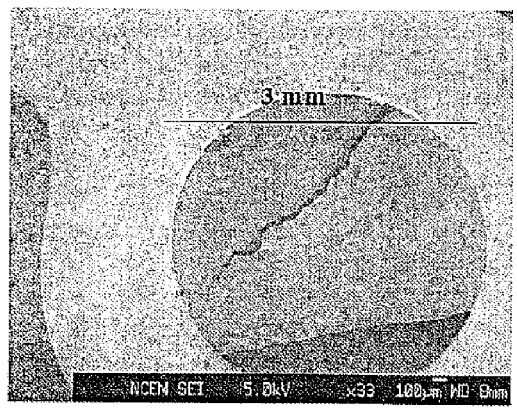
FIGS. 4 and 4a are very low magnification scanning electron micrographs of the surface of the nanotube film showing the continuous occurrence of nanotubes.
Figure 4A:
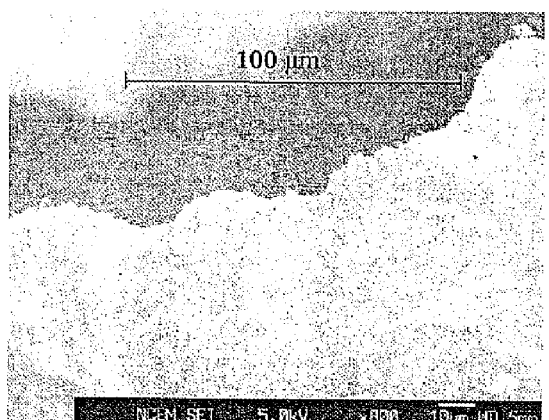
Figure 5:
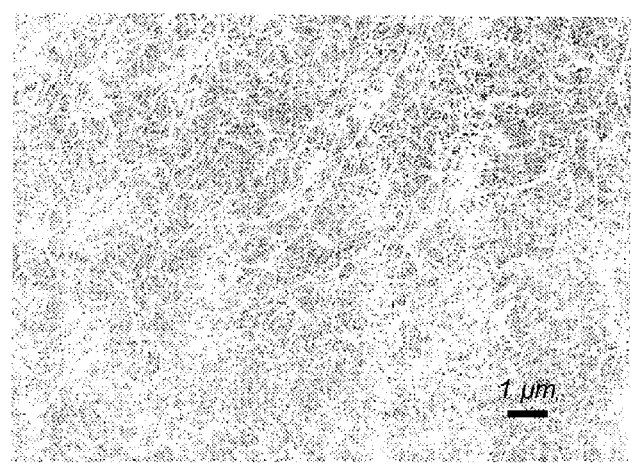
FIG. 5 is a higher magnification scanning micrograph of a nanotube mat revealing the presence of very long (>100 μm) nanotubes.
Figure 6:
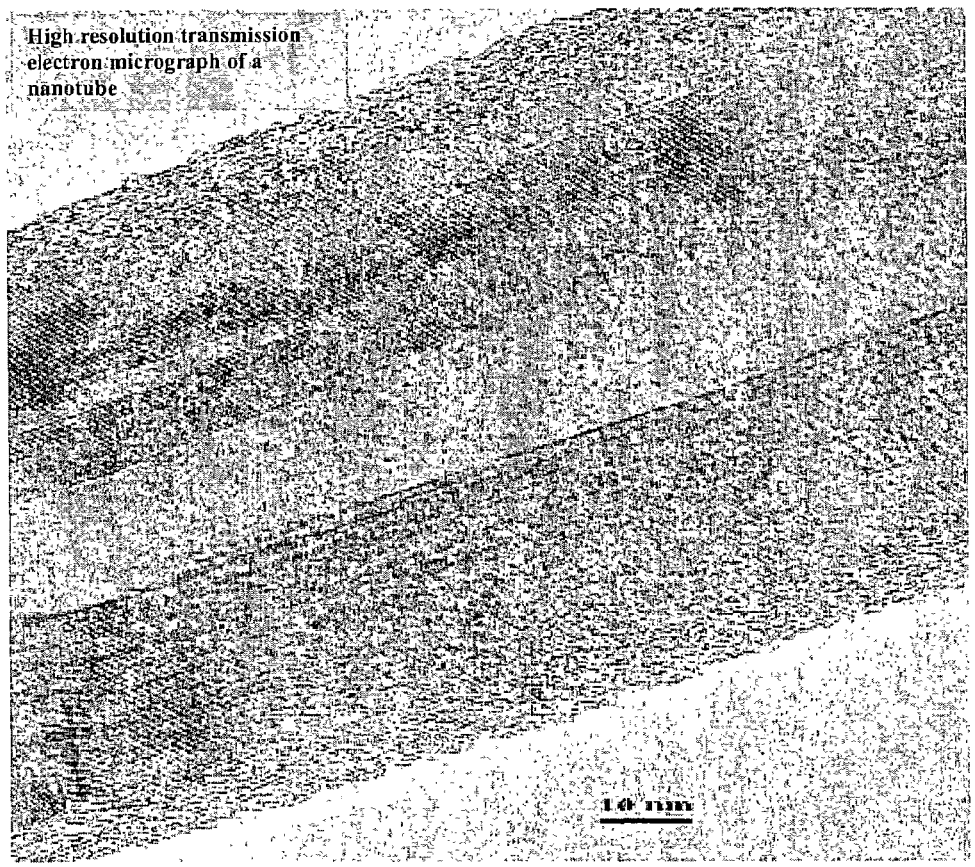
FIG. 6 is a high magnification, high-resolution, transmission electron micrograph of a carbon nanotube present in a film such as shown in FIG. 4.
Figure 7:
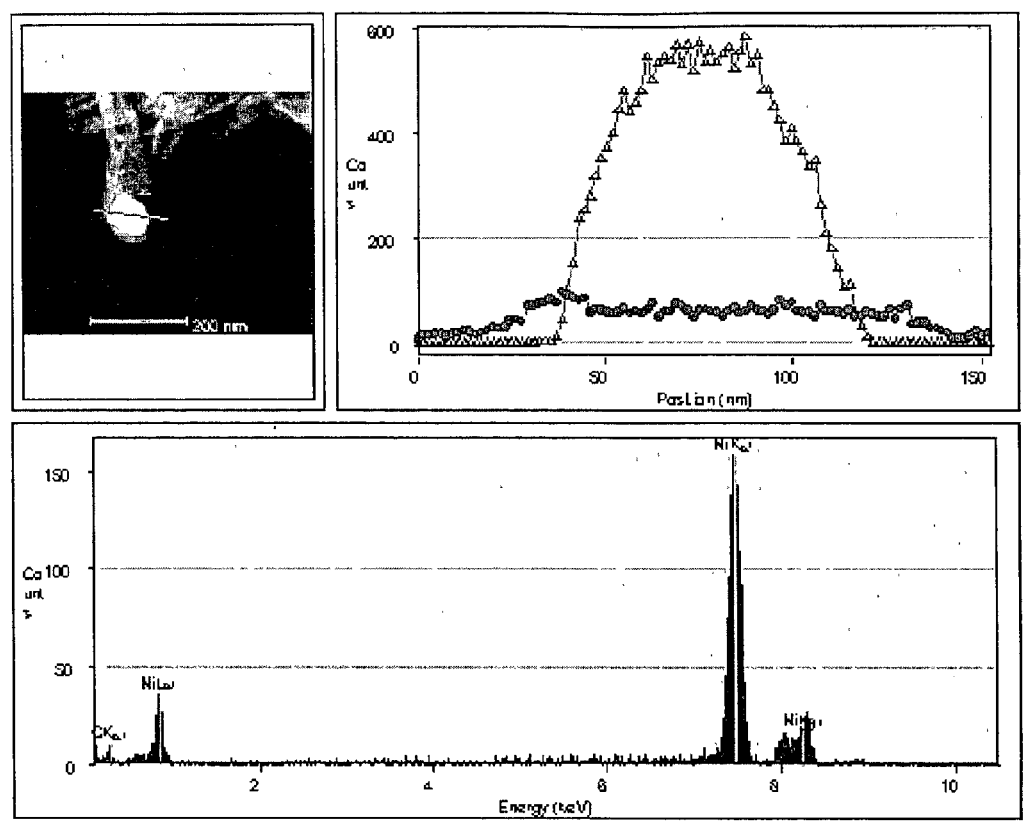
FIG. 7 is a spatially resolved (<5 nm) energy dispersion spectrum of a nanotube containing a nickel particle and FIG. 7a is a high resolution micrograph showing the fcc nickel particle present.
Figure 7A:
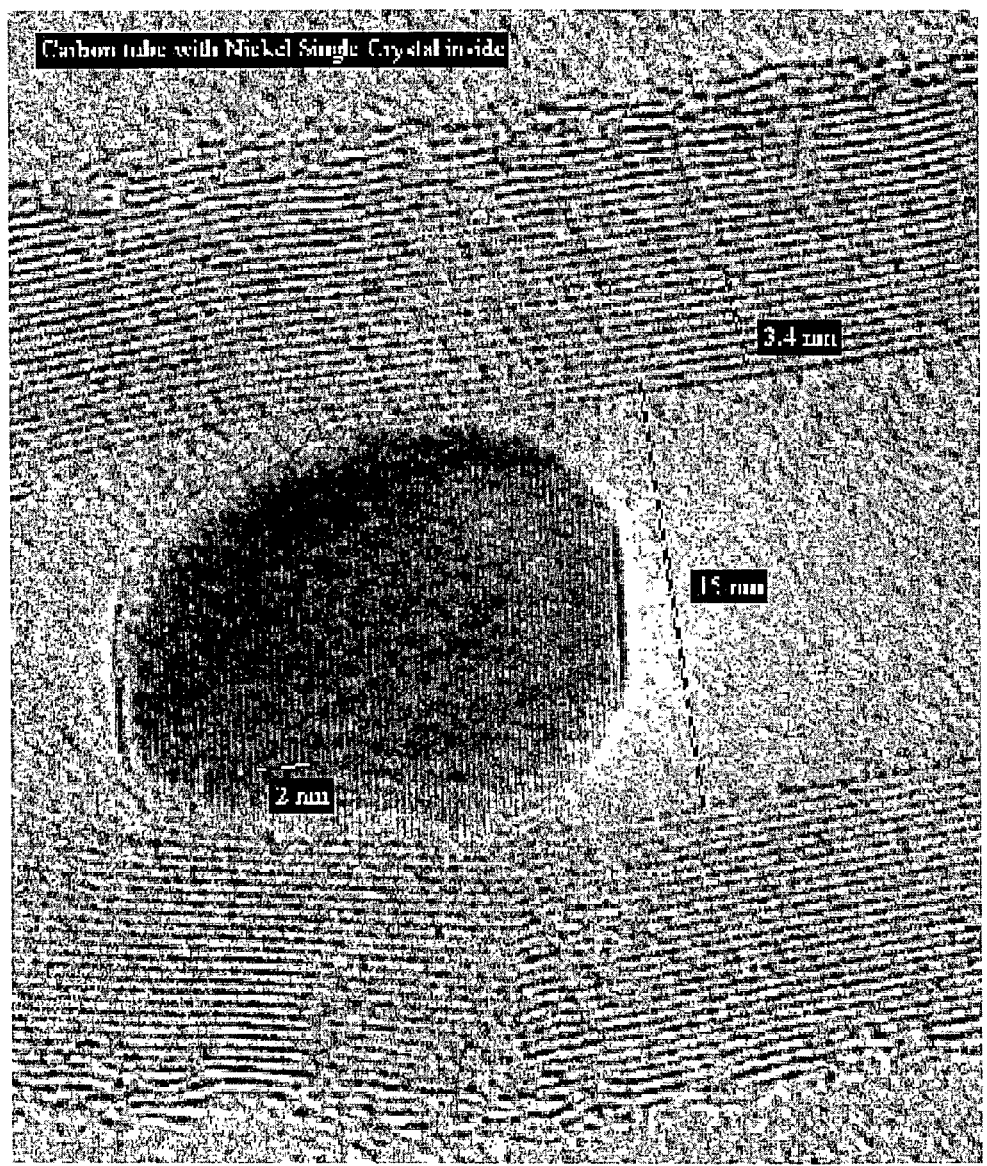

Solid state analyses of the as prepared nanomats, including low-magnification transmission electron microscopy (FIG. 2), X-ray diffraction (FIG. 3), and scanning electron microscopy (SEM) (FIGS. 4, 4a, 5) revealed an abundance of nanotubes and their highly graphitized nature. Further analyses by high-resolution transmission electron microscopy (HRTEM) and spatially resolved, energy dispersion spectroscopy (EDS) revealed the graphitic internal structure of the nanotubes and the metal nanoparticles present encapsulated inside the tubes (FIGS. 6, 7 and 7a).

Amorphous carbon forms or planar graphitic areas increased when the thermolyses of the complexes were carried out below or above the optimal temperatures. These results, in accordance with another aspect of the invention, provided nanosized metal particles useful in catalysis.

From the detailed analyses of the nature of the metal nanoparticles formed in the product, catalytically useful materials were identified. For example, starting with the cobalt complex of Example 1 as the precursor, under optimal conditions, cobalt nanoparticles with narrow diameter distribution were produced. Since the cobalt particles are produced free of carbides, and with the kinetically active cubic structure (fcc) as opposed to the thermodynamically favored hexagonal structure (hcp), they are useful in catalysis. These nanoparticles, since they are encapsulated in a carbon matrix, do not interconvert from fcc to hcp, upon standing (>1 year) and/or thermal annealing (under both these conditions, cobalt fcc particles produced by other known methods spontaneously convert to the more stable hcp structures).

The following examples illustrate, but do not limit, the invention.

EXAMPLE 1

Figure 8A:
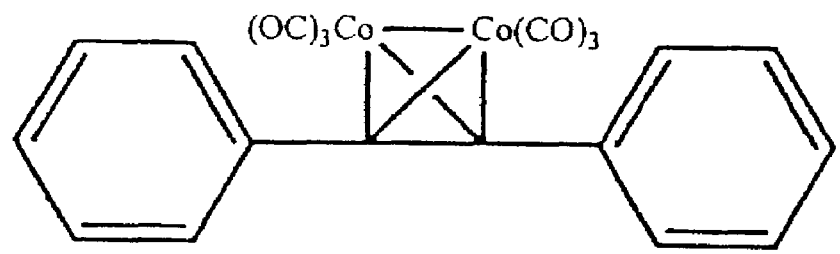
FIG. 8a shows a cobalt—diphenylacetylene complex which can be used as a nanotube precursor.
Figure 8B:
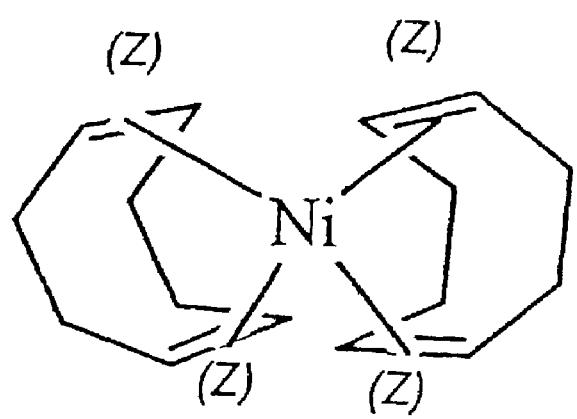
FIG. 8b shows a nickel compound which can be reacted with diphenylacetylene to form a nanotube precursor.

The cobalt complex 1 shown in FIG. 8a (Bull. Soc. Chim. Belg. 563 (1987) 96), prepared in a single step from commercial diphenylacetylene and dicobaltoctacarbonyl [Co$_2$(CO)$_8$] can be used. Nickel complexes derived in situ from the commercial nickel(1,5-cylcooctadiene)$_2$ [Ni(cod)$_2$]2 shown in FIG. 8b and diphenylacetylene can also be used. Upon heating, these complexes furnished free standing films made of nanotubes. Specifically, the heating of the transition metal complex is completed at a temperature between 400-800° C. and more particularly 550-700° C. for between 0.1 to 24 hours and more particularly 0.5-3 hours in a sealed vessel under a partial pressure of argon or helium.

The structure of the films was analyzed in bulk by X-ray diffraction, SEM and HRTEM. X-ray analysis revealed the highly graphitized nature of the film, the characteristic graphite inter-planar distance at 3.4 Å, and the absence of amorphous carbon structures. The surface of the film showed the abundance of carbon nanotubes when probed by SEM. SEM also identified the lengths of the nanotubes thus produced at >100 μm. HRTEM examination of the film further supported the results obtained from X-ray and SEM and showed the presence of nanotubes and the remarkable absence of amorphous carbon structures. Careful HRTEM imaging of several hundred nanotubes showed that the nanotubes had an average diameter distribution of 20-30 nm. Some of the tubes had encapsulated metal nano-particles present. These were unambiguously characterized by spatially resolved EDS (with ~1 nm resolution) and HRTEM as single crystals of metal (e.g. Co, Ni). No metal carbides were detected. Since the precise composition of the starting complex is very well determined, the elemental composition of the precursor is predetermined. For example, in the case of the complex 1, the metal/carbon ratio is at 0.49. The resultant soot as a result had 40% cobalt, which was experimentally confirmed by quantitative EDS. Treatment of the film with concentrated HCl removed some of the metal present outside the nanotubes that by conventional quantitative chemical analysis was determined to be 25%. Hence, by acid treatment the metal content in the soot sample was reduced to 15%. Complexes with metal/carbon ratios as low as 11% were identified as suitable precursors. Thus, one of the objectives of this invention, namely, the precise control of metal/carbon ratios in the starting precursor and the product, was achieved (control of metal/carbon ratio is generally difficult to achieve as is well known in the art). More favorable metal/carbon ratios, corresponding to <5%, even without acid treatment, were also achieved as shown in the following.

EXAMPLE 2

In accordance with the present invention, additional carbon sources together with the complexes described above were also found to give carbon nanotubes. For example, hexaphenylbenzene when mixed with transition metal alkyne complexes acted as a suitable precursor for carbon nanotubes. Advantageously, such a modification also acted as a controlling factor for the lengths of nanotubes prepared, with nanotubes produced having lengths at <5 μm. Thus by choosing a suitable complex and carbon source, metal/carbon ratios of <5% were successfully achieved.

Changes and modifications in the specifically described embodiments can be carried out without departing from the scope of the invention which is intended to be limited only by the scope of the appended claims.

The invention claimed is:

1. A method of preparing carbon nanotubes, comprising heating a precursor comprising a transition metal complexed alkyne in a sealed vessel to temperatures between 400° C. and 800° C.

2. The method of claim 1 wherein the alkyne has aryl, alkyl, alkenyl, or alkynyl substituents.

3. The method of claim 1 wherein the alkyne is a diarylacetylene.

4. The method of claim 1 wherein the alkyne is diphenylacetylene; 1-phenylpentyne; hexaethynylbenzene; or trans-4-phenyl-2-buten-1-yne.

5. The method of claim 1 wherein the alkyne has the general formula

where each of R1, R2 is an aryl, alkyl, alkenyl, or aikynyl substitutent.

6. The method of claim 1 wherein the transition metal is Co, Ni, Fe or Mo.

7. The method of claim 1 further comprising including in the precursor an additional carbon source.

8. The method of claim 1 wherein the carbon nanotubes are in the form of a free standing film.

9. The method of claim 1 further comprising removing metal from the exterior of the nanotubes and retaining nano-sized metal particles in the nanotubes.

10. The method of claim 9 wherein the metal is removed by washing with acid.

11. The method of claim 1 wherein the heating of the transition metal complexed alkyne is carried out at a temperature between 400-800° C. for between 0.1 to 24 hours.

12. The method of claim 1 wherein the heating of the transition metal complexed alkyne is carried out at a temperature between 550-700° C. for between 0.5-3 hours.

13. The method of claim 1 wherein the heating of the transition metal complexed alkyne is carried out in an inert atmosphere.

14. The method of claim 1 wherein the heating of the transition metal complexed alkyne is carried out at a partial pressure of argon or helium.

15. The method of claim 1 wherein the transition metal complexed alkyne is separately formed and isolated before fabrication of the nanotubes.

16. The method of claim 1 wherein the transition metal complexed alkyne is formed in situ during the production of the nanotubes.

17. A method of preparing carbon nanotubes, comprising:
providing a sealed vessel containing a mixture consisting essentially of:
a transition metal complexed alkyne in a solid state;
an optional additional solid carbon source; and
an inert gas; and
heating the sealed vessel.

18. A method of preparing carbon nanotubes absent amorphous carbon structures, comprising heating a precursor comprising a transition metal complexed alkyne in a sealed vessel.

* * * * *